United States Patent Office 3,520,622
Patented July 14, 1970

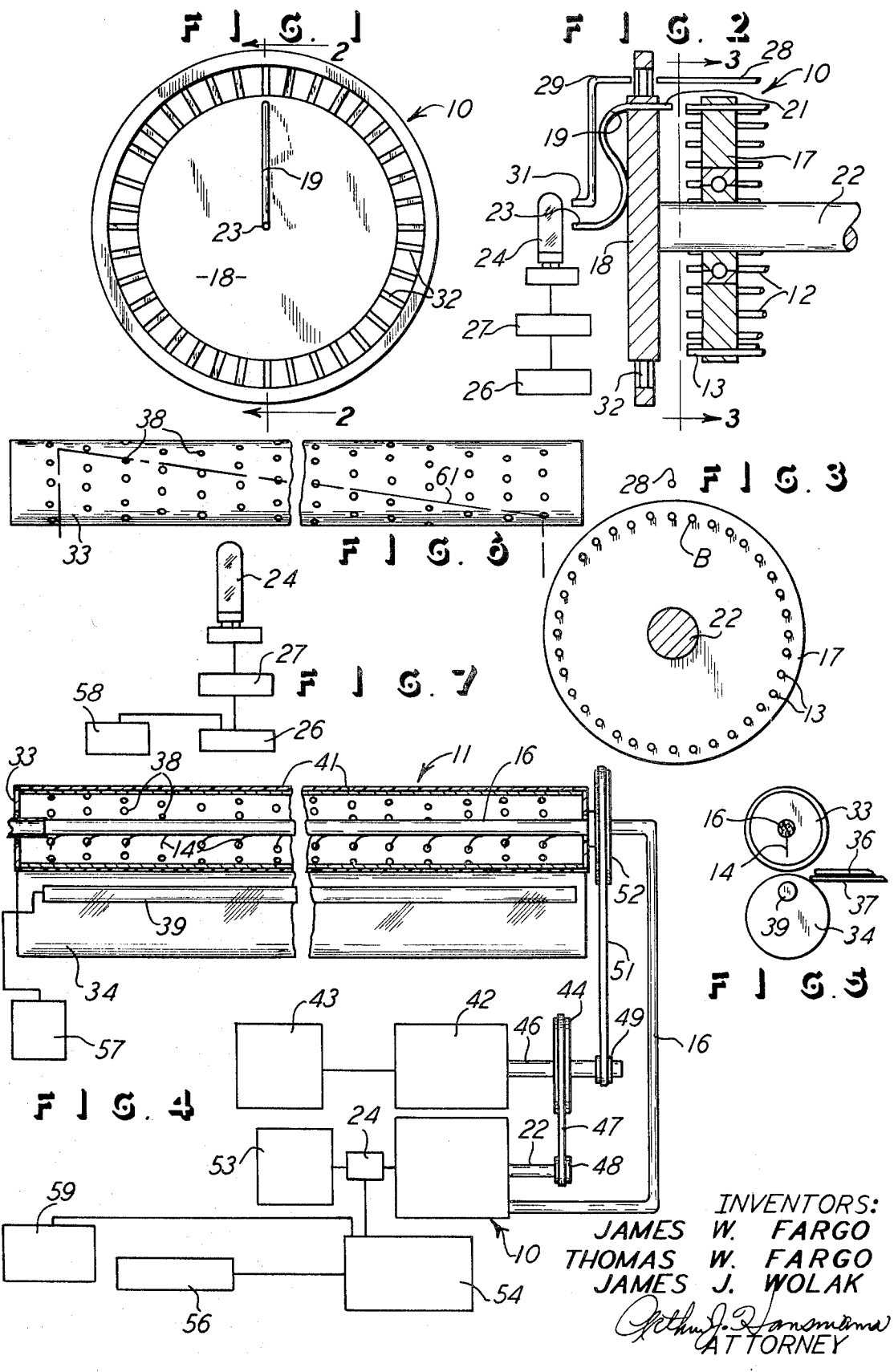

3,520,622
METHOD AND MEANS FOR OPTICAL SCANNING
James W. Fargo, Kenosha, Thomas W. Fargo, Racine, and James J. Wolak, Brookfield, Wis., assignors to Custom Control Products, Inc., Racine, Wis., a corporation of Wisconsin
Filed June 19, 1967, Ser. No. 646,946
Int. Cl. G01b 11/28
U.S. Cl. 356—158                                            16 Claims

ABSTRACT OF THE DISCLOSURE

An optical scanner having fiber optic rods extending from an exposure location to a scanner for detecting the presence of objects at the exposure location. A photocell registers the presence of light in the fiber optic rods passing through the scanner, and means for generating a pulse is provided and is synchronized with the scanning of the fiber optic rods. Rollers are shown for conveying a sheet-like object between the rollers at the exposure end of the fiber optic rods, and the fiber optics are arranged out of sequence at the exposure end compared to the sequence or order of scanning at the scanner.

BACKGROUND OF THE INVENTION

This invention relates to an optical scanner and a method of optical scanning. Optical scanners for detecting the presence of light rays, even through the use of fiber optics, are known. The scanning device and method of the present invention have particular application in detecting the presence of objects, and particularly, the device and method are for measuring the area of sheet-like objects. These sheets may be hides used in a tannery where it is desired that the hide be passed through the machine and the total area of the hide be measured and recorded.

Optical scanners for reading charts, for measuring areas of sheets, and for detecting the presence of objects, are generally known. For instance, U.S. Pat. 3,249,692 discloses an optical scanner using fiber optics for reading a chart, and for reading a punched card. Another example of prior art patents is U.S. Pat. 3,063,153 which also utilizes fiber optics, but the use is for the transmission of a picture or the like.

The prior art devices are complex, for uses different from that of the present invention, and fundamentally the structures of the prior art devices differ from the present device and method. One concern with prior art devices is to obtain a desired degree of accuracy in detecting an object, such as in measuring its projected area. Another problem with prior art devices is relating to the conveyance and feeding of the object or objects through the machine. Normally, the prior art conveyors simply support the object on a table and move it past the fiber optics or other detectors employed, but they do not positively hold the object, nor do they feed the object at a speed relative to the scanning speed so that maximum accuracy can be achieved in observing the object.

Also, where electronic pulses are utilized and recorded in observing and detecting the object, the prior art devices have been complicated in both production and recording of the pulses. In fact, some prior art devices create and record pulses when the object is not present, and they then deduct the total recorded pulses from a standard number and thereby indirectly conclude that the remainder of pulses has detected the object in whatever manner desired. Such method and device is of course operating in an indirect manner rather than positively, as is done in the present invention where the pulses are positively recorded to indicate the presence of the object.

Specifically, prior art devices utilized for detecting objects can actually miss the presence of certain objects, depending upon the shape of the object. That is, if a sheet is to be measured for its area, and if the leading edge of the sheet is an irregular shape, then the prior art devices which scan from one side of the sheet in consecutive order to the other side of the sheet, may actually be highly inaccurate in that the front edge of the sheet may be diagonally disposed in a manner to have detecting means miss the entire front edge. Thus the first scan cycle may not record the presence of the object at all, and the second scan cycle might record it but it is then likely that it will not accurately record the area of the front portion of the sheet. The present invention avoids this problem and makes the detection of area more accurate by utilizing a so-called "random scanning." This is scanning in a sequence at the scanner, but having the fiber optic rods or other means of conducting light rays arranged out of the scanning sequence and in a different order to effectively jump back and forth across the line of direction of movement of the sheet in the scanning.

BRIEF DESCRIPTION OF THE DRAWING

FIG. 1 is a front elevational view of a scanning wheel.

FIG. 2 is a side elevational view of the scanner, shown partly in section.

FIG. 3 is a sectional view taken on the line 3—3 of FIG. 2.

FIG. 4 is a diagrammatic view of the device, with one roller thereof shown in section, and with parts broken away.

FIG. 5 is an end elevational view of the rollers in FIG. 4.

FIG. 6 is a side elevational view of the sectioned roller in FIG. 4.

FIG. 7 is a diagrammatic view of a portion of the device, and showing an embodiment different from that shown in FIG. 2.

DETAILED DESCRIPTION OF THE EMBODIMENTS AND THE METHOD

Generally, a rotary-type scanner 10 is operatively connected to a conveyor 11, by means of light transmitting members 12, which are indicated to be fiber optic rods. Thus, the ends 13 of the fiber optic rods terminate at the scanner 10, and the ends 14 of the fiber optic rods terminate at the conveyor 11. The fiber optics 12 are shown to be in a collection or bundle designated 16, and the individual ends 13 and 14 extend off from the bundle 16 for their specific locations, as shown.

The scanner 10 has a support 17 which receives the fiber optic rod ends 13 to stationarily mount them. A scanner wheel 18 carries a single fiber optic rod 19 and which has its end 21 disposed for alignment consecutively with the fiber optic rod ends 13, upon rotation of the wheel 18 which is mounted on the rotatable shaft 22. The other end 23 of the fiber optic curved rod 19 is exposed to a photocell 24. Thus any light transmitted through the rod 19 will activate the photocell 24, as desired. The photocell 24 is shown in FIG. 2 to be connected to an electronic recorder 26 through an amplifier 27. Thus light-ray pulses detected by the photocell 24 will be registered by the recorder 26.

FIG. 2 also shows that the scanner 10 has a type of pulse generator which includes a light transmitting rod, such as a fiber optic rod 28, and it has a fiber optic rod 29. The end 31 of the rod 29 is also exposed to the photocell 24 to record any light passing through the rod 29, which light may be coming from the rod 28. To cause the light transmission in the rod 29 to be pulsing, the scanning wheel 18 has spokes 32 which extend in alignment with the rods 28 and 29 to interrupt transmission of light therebetween. Thus, upon rotation of the wheel 18, there will be a pulsing detected by the photocell 24. Further, the pulsing in the photocell 24 is dependent upon the passage of light rays through the rod 29. FIG. 1 shows that the rod 29 is aligned with one of the spokes 32, and thus if both the rod 28 and the rods 12 have light passing therethrough, there will then be no pulsing of the photocell 24. The arrangement is such that the light rays are synchronized and out of phase with respect to each other, with regard to the pulsing that they create, at least by means of the spokes 32 passing between the stationary rods 28 and 29. The rods 12 may always be arranged with rod 19 to constantly pass light to the rod 19 upon rotation of the rod 19 along with its supporting wheel 18. However, if an object is passed through the conveyor 11, then the rod ends 14 in the conveyor 11 will not detect light and therefore there will be no light at the ends 13 of the fiber optic rods. Under that condition of the presence of an object, the light is not passed through the rod 19 and to the photocell 24, and thus the naturally created pulses passing through the rod 29 are recorded by the recorder 26 as the pulses pass from the photocell 24 where they are detected.

In this manner, the device detects the presence of an object in the conveyor 11, and such detection may actually be, and preferably is, such that the area of a sheet-like object passing between the rollers 33 and 34, forming the conveyor 11, can be measured. Rod ends 14 are stationarily mounted in roller 33.

The rollers 33 and 34 are arranged essentially in rolling contact to feed a sheet, designated 36 in FIG. 5, off a supporting table 37 and between the rollers 33 and 34. The roller 33 is shown to have a plurality of openings 38 therethrough, and the fiber optic ends 14 aligned with the various openings 38 for detecting light coming from the light source 39, which is shown to be essentially a fluorescent tube. Thus the roller 34 is transparent, and the tube 39 is stationarily disposed inside the roller 34 which rotates in rolling contact with the roller 33, as mentioned. Further, the roller 33 may have a high-friction material cover, such as rubber or other material of a synthetic, and such material is generally designated 41. Thus there is good frictional drive between the rollers 33 and 34 with regard to the material 36. Therefore, the material 36, especially if it is a leather hide to be measured in area, can actually be placed between the two rollers 33 and 34, which are the nature of pinch rollers, and the hide can be straightened and stetched by pulling on the sides and trailing ends as it is being fed between the rollers 33 and 34 for accurate measurement of its area.

The holes 38 are shown to be arranged in vertical rows which align with the fiber optic ends 14, as mentioned. Likewise, each row of holes includes a plurality of holes 38. This permits the roller 33 to rotate slowly compared to the speed of the scanning disc 18. That is, the disc 18 may scan each fiber end 13 every time one of the holes 38 aligns with a fiber end 14 in each row of the holes 38. One ratio of rotation between the scanning wheel 18 and the roller 33 may be 30 to 1, and, therefore, there would be 30 holes in each of the rows of holes 38.

The particular arrangement shown indicates that there may be 36 fiber optic rods 12 utilized. Of course there can be any number involved, but 36 is used in this showing and for the required example. Thus there would then be 36 rows of holes 38 in the roller 33, and likewise, there would be 36 fiber optic rod ends 14. Of course the fiber optic rod 19 scans the rod ends 13 in sequence, that is, one rod after the other in the exact order of their arrangement in the circular pattern shown in FIG. 3. However, the fiber optic rods 12 do not necessarily extend into the conveyor 11 to have the ends 14 arranged in the same sequence as that of the ends 13. That is, the ends 14 are arranged in a "random scanning" order, and where there are 36 ends 14 extending along the cylinder 33, the scanning arrangement is such that it may be explained with reference to considering the ends 14 numbered 1 through 36 from left to right in sequence in FIG. 4. Then the order of scanning, in order to be "random" may be as follows:

1–21–10–30–11–31–20–5–25–6–26–15–35–16–36–2–22–9–29–12–32–19–3–23–7–27–13–33–17–8–28–4–24–18–14–34.

Thus, the fiber end 1 at the left in FIG. 4 would be the top fiber end 13 in FIG. 3; the twenty-first fiber end from the left in FIG. 4 would lead to the second position in FIG. 3, and that may be to the end designated B in FIG. 3 where the wheel 18 is rotating clockwise in FIG. 3.

Of course, the holes 38 are arranged in the roller 33, and the holes extend through the roller proper as well as its cover 41, so that the holes 38 align with the fiber ends 14 in the firing order described above.

A motor 42 is shown diagrammatically in FIG. 4 to be under the influence of a motor control 43. A pulley 44 is secured to the motor shaft 46, and has a cog belt 47 which extends to a pulley 48 on the scanner shaft 22. Also, a pulley 49 is secured to the motor shaft 46 and has a cog belt 51 extending to a pulley 52 secured to the roller 33 for rotating the latter. It will be noted that the pulley 44 is shown larger than the pulley 48, and this may be five times larger, and the pulley 52 is shown larger than the pulley 49, and this may be six times larger. Therefore, the drive ratio between scanner and roller may be 30 to 1, as mentioned.

FIG. 4 also shows the photocell 24 powered by a current supply or source 53, and this may preferably be a direct current source so as not to interfere with the pulsing described. An electronic counter 54 is connected to the photocell 24, and this counter may of course be the recorder 26. A read-out mechanism 56 is connecteed to the counter 54, and a power supply 57 is shown connected to the light source or tube 39.

While FIG. 2 shows that the pulse means is built into the scanner by means of the rod 29 aligned with the wheel spokes 32, FIG. 7 shows that the rod 29 may be eliminated, and a pulse generator 58 may be connected to the counter 26. This would therefore still present pulses in the counter 26 whenever the material 36 is blocking the light passing from the source 39 to the fiber optic ends 14.

Likewise, a pulse generator 59 is shown connected in FIG. 4 to the counter 54. In all instances and embodiments, the pulses created by the pulse generator, whether it be the rod 29 or the generator 58 or 59, are out of phase with the pulsing of light passing through the photocell 24 by means of rotation of the scanning rod 19. That is, the scanning rod 19 and the pulse generator are synchronized to normally cancel the pulsing effect of each other. Only when material is present and blocking the light passing to the rod ends 14, is the pulsing detected in the recorder 26 or the counter 54.

The foregoing describes the two embodiments and the method of optical scanning. Broken lines 61 in FIG. 6 indicate a sheet being conveyed by roller 33. Sheets are commonly fed between rollers by inserting a sheet corner. Where the holes 38 are aligned in rows for sequential scanning in order from left to right, the entire front edge of the sheet could be missed on the first scan cycle. That is, the holes 38 would be parallel to the front edge of the sheet. Of course the firing order would be arranged like the holes where the latter are in both vertical and horizontal rows.

To avoid the aforementioned error, the holes 38 in roller 33 are randomly located. Thus the diagonal sheet edge will cover at least some of the holes 38 to register a pulse, as desired. There is, therefore more accuracy in this "random scanning," which is actually carefully laid out, as described.

All fiber optic rods described are flexible for conducting light in a curved path.

What is claimed is:

1. In a method of optical scanning for observing an object, the steps of providing a light source, transmitting a plurality of light rays from said light source to a scanning location, scanning said light rays at said scanning location in given frequency, passing an object between said light source and said light rays for interrupting the transmission of said light rays to said scanning location, transmitting said light rays to a sensing system and sensing said light rays at said system, generating pulses and sensing said pulses at said system, the improvement comprising generating said pulses in a frequency out of phase with the frequency of said scanning of said light rays and complementary thereto for obscuring said pulses at said system only when said light rays are transmitted to said scanning location, and sensing said pulses only when said light rays are interrupted by the presence of said object.

2. The method of claim 1, including the step of simultaneously scanning and generating pulses in a scanning disc for obtaining the out-of-phase frequencies between the two functions.

3. The method of claim 2, including the step of transmitting said light rays and said pulses from said disc to a single photocell.

4. The method of claim 1, wherein said object is moved transverse to said light rays and at a speed synchronized with the frequency of pulsing for detecting the area of the said object blocking said light rays to said scanning location.

5. The method of claim 1, including the step of recording said pulses only when said light rays are interrupted by the presence of said object.

6. The method of claim 1, wherein said step of scanning of said light rays is in consecutive order, and the step of arranging said light rays at said light source in a pattern different from said consecutive order at said scanning location for sequentially detecting remote parts of said object.

7. The method of claim 6, including the step of passing said object by placing it into rolling contact with a conveyor cylinder, and the step of transmitting said light rays along fiber optic rods placed inside said cylinder having holes for exposure of said fiber optic rods outside said cylinder.

8. In an optical scanning device for observing an object, a light source, a scanner, a plurality of fiber optic rods extending between said light source and said scanner and being arranged to be individually scanned in timed frequency for the presence of light rays, a conveyor for passing an object to be observed between said light source and said fiber optic rods, detection means in communication with said fiber optic rods and arranged for receiving said light rays passing through said scanner, the improvement comprising pulse generating means for producing pulses in a frequency out of phase with the frequency of scanning of said fiber optic rods and complementary thereto to have said pulses detectable only when said light rays are not present in said fiber optic rods, and transmission means for communicating said pulses to said detection means.

9. The subject matter of claim 8, including recording means for registering said pulses when they are detectable at the time that said fiber optic rods are being blocked from said light source by said object.

10. The subject matter of claim 8, including a scanning disc included in said scanner and said pulse generating means including said scanning disc, and with said scanning disc having openings therethrough for said pulse generating means, and with said openings and said fiber optic rods at said scanner both being located on two different circles to be staggered from each other for the out-of-phase pulsing.

11. The subject matter of claim 10, including said detection means including a single photocell for detecting both said light rays and said pulses.

12. The subject matter of claim 9, including conveyor means disposed for moving said object intermediate said light source and said fiber optic rods for interrupting the transmission of emitted light rays to said fiber optic rods in accordance with the projected area of said object transverse to said emitted light rays.

13. The subject matter of claim 12, wherein said fiber optic rods are in different order between their ends adjacent said light source compared to their ends adjacent said scanner, for staggered-type scanning of said object.

14. The subject matter of claim 8, wherein said conveyor includes a rotatable cylinder in rolling contact with a flat one of said objects, and said fiber optic rods being disposed inside said cylinder which has holes therein for exposure of said fiber optic rods outside said cylinder.

15. The subject matter of claim 8, wherein said pulse generating means is a part of said scanner and includes a second group of fiber optic rods conducting additional light rays constituting said pulses upon scanning, and the two groups of said fiber optic rods extending to said detection means and conducting all said pulses to said detection means until the pulses in the first said group are blocked by the presence of said object and to then have the pulses in the second said group remain at said detection means to pulse said detection means.

16. The subject matter of claim 15, including recording means for registering said pulses when they are detectable at the time that said fiber optic rods are being blocked from said light source by said object.

References Cited

UNITED STATES PATENTS 3,312,140    4/1967    Dokoupil          350—96
3,354,319    11/1967   Loewen et al.      250—233

RONALD L. WIBERT, Primary Examiner

P. K. GODWIN, JR., Assistant Examiner

U.S. Cl. X.R.

250—233; 350—96